(12) United States Patent
Yang

(10) Patent No.: US 6,437,544 B1
(45) Date of Patent: Aug. 20, 2002

(54) SERIAL STAGE POWER SUPPLY COMBINATION FOR EMERGENCY AUXILIARY CHARGING APPARATUS

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 10/022,410

(22) Filed: Dec. 20, 2001

(51) Int. Cl.$^7$ .................................................. H02J 7/00
(52) U.S. Cl. ........................................ 320/167; 320/166
(58) Field of Search ................................ 320/167, 166, 320/140, 137, 107; 363/126, 97

(56) References Cited

U.S. PATENT DOCUMENTS 6,169,389 B1 * 1/2001 Chen ........................... 320/166

* cited by examiner

Primary Examiner—Gregory Toatley
Assistant Examiner—Lawrence Luk
(74) Attorney, Agent, or Firm—Bacon & Thomas

(57) ABSTRACT

An improved emergency auxiliary power supply comprised of a rechargeable secondary battery or a super capacitor to function as an emergency charging source; a conduction train, an optional charging control circuit and another optional first storage unit comprised of a diode on the output side to prevent inverse voltage and connected to a second storage in the load coupled to the output are provided to comprise a DC power supply system allowing flexible combination with at least two stages for serial stage power supply.

7 Claims, 3 Drawing Sheets

SERIAL STAGE POWER SUPPLY COMBINATION FOR EMERGENCY AUXILIARY CHARGING APPARATUS

BACKGROUND OF THE INVENTION (a) Field of the Invention

The present invention is related to a serial stage power supply combination for emergency auxiliary charging apparatus, and more particularly, to an improved combination for emergency auxiliary charging and various applied circuits.

(b) Description of the Prior Art

A single voltage source is available as a charging source in conventional storage as a charging apparatus for a charging source.

SUMMARY OF THE INVENTION

The primary purpose of the present invention is to provide an improved emergency auxiliary power supply comprised of a rechargeable secondary battery or a super capacitor to function as an emergency charging source. A conduction train for charging purpose, an optional charging control circuit and another optional first storage unit comprised of a diode on the output side to prevent inverse voltage and connected to a second storage in the load coupled to the output are provided to comprise a DC power supply system allowing flexible combination with at least two stages for serial stage power supply.

DETAILED DESCRIPTION OF THE PREFERRED EMBODIMENTS

In the improved serial stage power supply combination for emergency auxiliary charging of the present invention, the emergency auxiliary power supply is comprised of a rechargeable secondary battery, a super capacitor or any other type of storage to function as an emergency charging source. A conduction train for charging purpose is provided. An optional charging control circuit and a diode to prevent inverse voltage on the output side are provided to form a first storage unit, which replaces the conventional disposal primary battery, to further form with a secondary storage in the load coupled to the output a DC power supply system. The system contains at least two stages of rechargeable secondary battery or allows flexible combination with other rechargeable storage to execute serial stage power supply.

Figure 1:
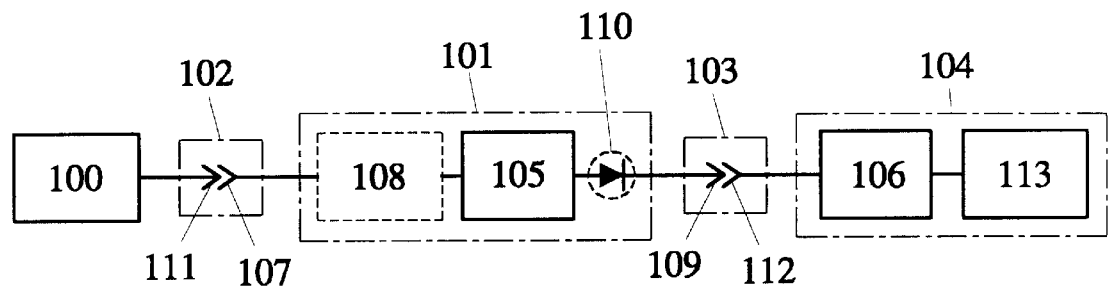
FIG. 1 is a block chart showing a preferred embodiment of an improved serial stage power supply combination for an emergency auxiliary charging apparatus of the present invention.

FIG. 1 shows a block chart of a preferred embodiment of the present invention. Wherein, a DC power supply system allowing flexible combination of serial stage power supply by means of at least two stages of a rechargeable secondary battery or other type of storage is essentially comprised of:

a charging source 100: related to a DC source or a DC source converted from rectified AC to charge the emergency auxiliary power supply 101 or to charge the secondary rechargeable storage in the load, or to supply power to the load;

a conduction train 102: related to a conduction train of specific structure to execute positive-to-positive and negative-to-negative coupling for separated cut-off or incorporated conduction; and configured in plug and socket structure or that similar to an incorporation structure by insertion to transmit power from the charging source 100 to the emergency auxiliary power supply 101;

another conduction train 103: related to a conduction train of specific structure to execute positive-to-positive and negative-to-negative coupling for separated cut-off or incorporated conduction; and configured in plug and socket structure or that similar to an embedded incorporation structure to transmit power from the emergency auxiliary power supply 101 to the load unit 104;

the emergency auxiliary power supply 101: comprised of rechargeable secondary battery, super capacitor or other storage 105, having a capacity greater than that of another storage 106 in the load unit 104 and its charging input being directly connected to a pin 107 from the conduction train 102, or as required a charging control circuit 108 being provided between the charging input and the pin 107; its output being directly connected to a pin 109 from another conduction train 103, or as required a separation diode 110 being provided between the output and the pin 109; a corresponding pin 111 to the pin 107 being conducted to the charging source 100 and a corresponding pin 112 to the pin 109 being conducted to the load unit 104;

a charging control circuit 108: related to a mechano-electronic or solid state electronic device to fully or partially control charging current, voltage and charging time;

a separation diode 110: one or more than one diode element connected in series or serial-parallel between the emergency auxiliary power supply 101 and its output, or one or more than one diode connected in series or series-parallel to regulate the output voltage of the emergency auxiliary power supply 101 by means of its positive drop as required; and the load unit 104: including a rechargeable storage 106 comprised a rechargeable secondary battery, super capacitor other storage device, incorporated to a communication, information, home electric appliance, personal electric appliance, instrument, power tool and any other load 113 driven by the load unit 104.

Figure 2:
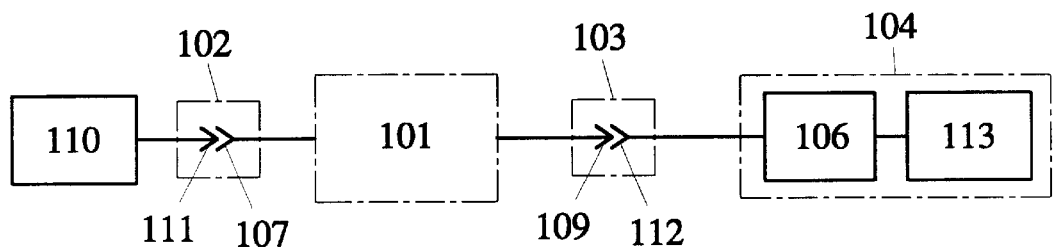
FIG. 2 is a block chart showing an applied circuit of the present invention, wherein, the charging source is supplying power to the emergency auxiliary power supply of the present invention and the emergency auxiliary power supply is charging the storage in the load unit, or is supplying power to the load unit at the same time.
Figure 3:
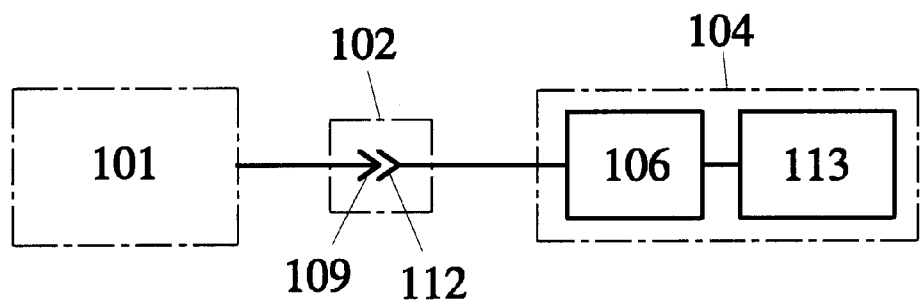
FIG. 3 is a block chart showing another applied circuit of the present invention, wherein, the emergency auxiliary power supply is charging the storage in the load unit, or is supplying power to the load unit at the same time.
Figure 4:
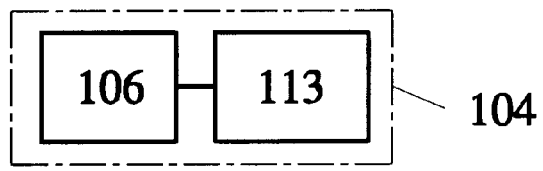
FIG. 4 is a block chart showing another applied circuit yet of the present invention, wherein, the load is driven by the power from the storage.
Figure 5:
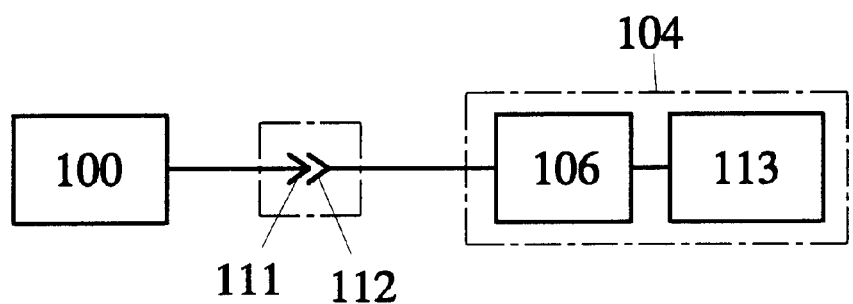
FIG. 5 is a block chart showing another applied circuit yet of the present invention, wherein, the charging source input is charging the storage in the load unit and is supplying power to the load unit at the same time.

Applied combinations of the improved serial stage power supply combination for the emergency auxiliary charging apparatus of the present invention include:

(1) As illustrated in FIG. 2, the charging source 100 supplies power to the emergency auxiliary power supply 101, inturn, the rechargeable storage 105 in the emergency auxiliary power supply 101 charges the storage 106 in the load unit 104 or supplies power to the load 113 at the same time;

(2) As illustrated in FIG. 3, the rechargeable storage 105 in the emergency auxiliary power supply 101 is charging another storage 106 in the load unit 104 or is supplying power to the load 113 at the same time;

(3) As illustrated in FIG. 4, the load 113 is driven by power supplied from the rechargeable storage 106 in the load unit 104; and (4) As illustrated in FIG. 5, the input of the charging source 100 is charging the rechargeable storage 106 in the load unit 104 and is supplying power to the load 113.

Figure 6:
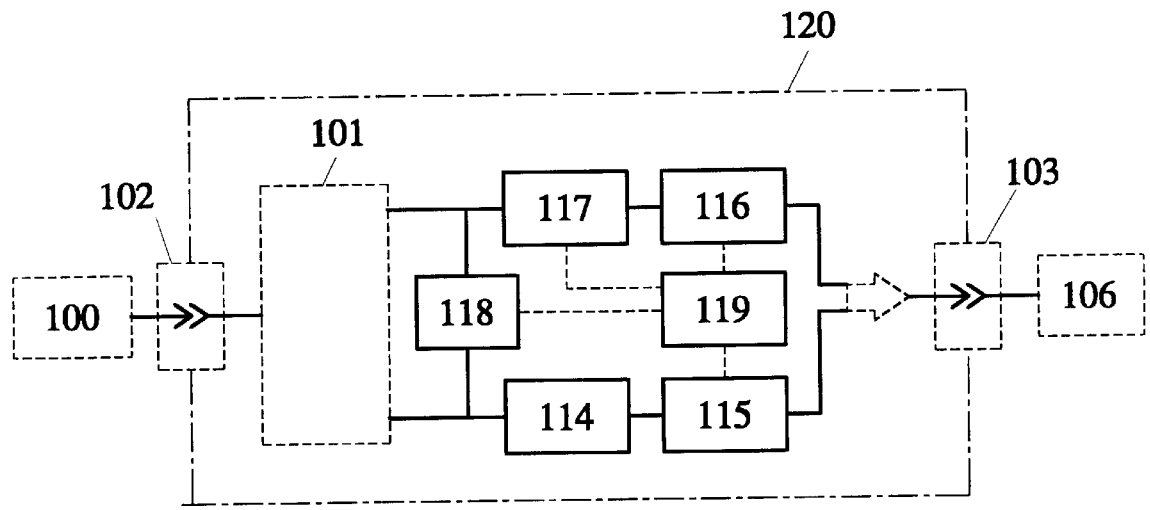
FIG. 6 is a block chart showing that a control and a protection for outputted voltage and amperage are added to the emergency auxiliary power supply of the present invention.

Additionally, voltage and current control and protection devices are provided between the emergency auxiliary power supply 101 and the conduction train 103 as required as illustrated in the circuit block chart in FIG. 6. Wherein, those control and protection devices for current and voltage outputted from the emergency auxiliary power supply 101 are essentially comprised of:

the emergency auxiliary power supply 101: comprised of rechargeable secondary battery, super capacitor or other storage 105, having a capacity greater than that of another storage 106 in the load unit 104 and its charging input being directly connected to a pin 107 from the conduction train 102, or as required a charging control circuit 108 being provided between the charging input and the pin 107; its output being directly connected to a pin 109 from another conduction train 103, or as required a separation diode 110 being provided between the output and the pin 109;

a conduction train 102: related to a conduction train of specific structure to execute positive-to-positive and negative-to-negative coupling for separated cut-off or incorporated conduction; and configured in plug and socket structure or that similar to an incorporation structure by insertion to transmit power from the charging source 100 to the emergency auxiliary power supply 101;

another conduction train 103: related to a conduction train of specific structure to execute positive-to-positive and negative-to-negative coupling for separated cut-off or incorporated conduction; and configured in plug and socket structure or that similar to an embedded incorporation structure to transmit power from the emergency auxiliary power supply 101 to the load unit 104;

an over-current breaker 114: alternatively, a short fuse, or a mechano-electronic or solid-state electronic current breaker connected in series with the source is or is not added to where between the emergency auxiliary power supply 101 and its output interface conduction train 103;

a limiting protection 115: alternatively, a limiting protection with it resistance changing in proportion with the amperage, comprised of a positive temperature coefficient (PTC) resistor, resistance device, mechano-electronic, or solid-state electronic device connected in series with the source is or is not added to where between the emergency auxiliary power supply 101 and its output interface conduction train 103;

a current detection circuit 116: an optional circuit provided between the output of the emergency auxiliary power supply 101 and its output interface conduction train 103 connected in parallel with the source; related to an analog or digital current detection device comprised of a mechno-electronic, or solid state electronic device, or an output current detection device indicator, or a detection circuit provided to control analog or digital voltage signal references, or a display being further included;

a switch 117: an optional provided between the output of the emergency auxiliary power supply 101 and its output interface conduction train 103 connected in series with the source; related to a switch operated by manual, a solid switch operated by signal, or a switch control circuit;

a voltage detection circuit 118: an optional circuit provided at the output of the emergency auxiliary power supply 101 and connected in parallel with the source; related to an analog or digital voltage detection device comprised of a mechno-electronic, or solid state electronic device, or an output voltage detection device indicator, or a detection circuit provided to control analog or digital voltage signal references, or a display being further included;

a central control 119: also an optional to be provided at the output of the emergency auxiliary power supply 101 to control the limiting protection or the switch and cause the limiting protection to increase resistance for inhibiting the amperage in case of over-current by referring to the outputted amperage; and control the switch to cut off the output once the amperage reaches the preset value; and a housing 120: made of insulation material, or non-insulation material lined inside with insulation material, accommodating and being integrated with all those devices described above.

Figure 7:
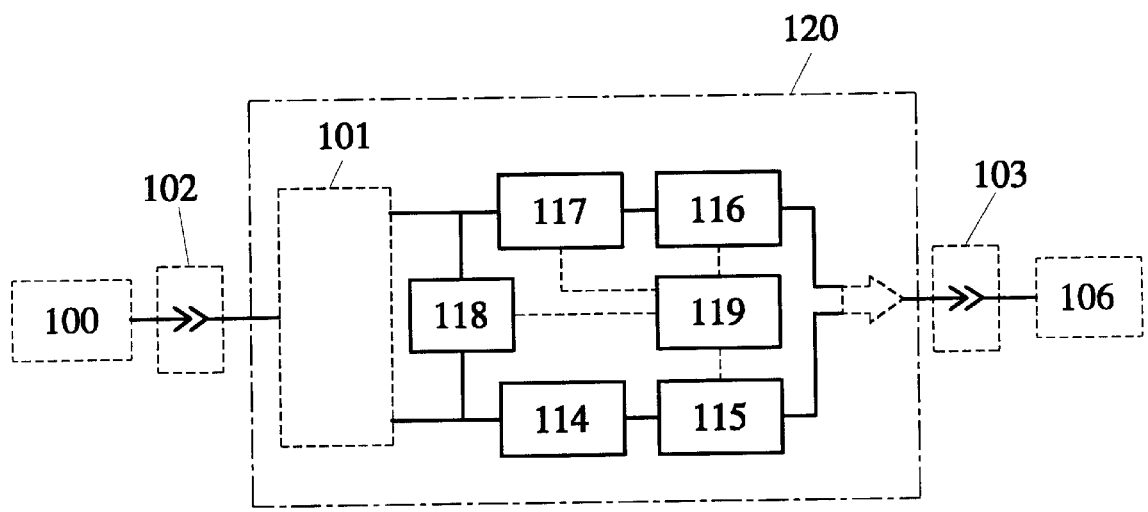
FIG. 7 is a bloc chart showing a circuit structure of coupling the output of the emergency auxiliary power supply of the present invention to a separately provided conduction train by means of a conductor.

Furthermore, as illustrated in FIG. 7, both of the conduction trains 102 and 103 are separated from the input and output of the emergency auxiliary power supply 101, and are connected to the emergency auxiliary power supply 101 by a conductor, or a second unit of plug and socket. FIG. 7 shows a block chart of a circuit structure, wherein, a conductor is used to couple the output of the emergency auxiliary power supply to the conduction train separately provided.

As disclosed above, an improved emergency auxiliary power supply charging apparatus of the present invention by further including a rechargeable secondary battery, a super capacitor or any other type of storage to function as an emergency charging source; a conduction train for charging purpose; an optional charging control circuit and a diode to prevent inverse voltage on the output side to form a first storage unit which replaces the conventional disposal primary battery, and to further form with a secondary storage in the load coupled to the output a DC power supply system containing at least two stages of rechargeable secondary battery or allowing flexible combination with other rechargeable storage to execute serial stage power supply; is innovative with precise function. Therefore, this application is duly filed accordingly.

What is claimed is:

1. An improved serial stage power supply combination for emergency auxiliary power supply, comprised of a rechargeable secondary battery, a super capacitor or any other type of storage to function as an emergency charging source; a conduction train for charging purpose; an optional charging control circuit and a diode to prevent inverse voltage on the output side are provided to form a first storage unit, which replaces the conventional disposal primary battery, to further form with a secondary storage in the load coupled to the output a DC power supply system containing at least two stages of rechargeable secondary battery and allowing flexible combination with other rechargeable storage to execute serial stage power supply essentially comprised of:

- a charging source 100: related to a DC source or a DC source converted from rectified AC to charge the emergency auxiliary power supply 101 or to charge the secondary rechargeable storage in the load, or to supply power to the load;
- a conduction train 102: related to a conduction train of specific structure to execute positive-to-positive and negative-to-negative coupling for separated cut-off or incorporated conduction; and configured in plug and socket structure or that similar to an incorporation structure by insertion to transmit power from the charging source 100 to the emergency auxiliary power supply 101;
- another conduction train 103: related to a conduction train of specific structure to execute positive-to-positive and negative-to-negative coupling for separated cut-off or incorporated conduction; and configured in plug and socket structure or that similar to an embedded incorporation structure to transmit power from the emergency auxiliary power supply 101 to the load unit 104;
- the emergency auxiliary power supply 101: comprised of rechargeable secondary battery, super capacitor or other storage 105, having a capacity greater than that of another storage 106 in the load unit 104 and its charging input being directly connected to a pin 107 from the conduction train 102, or as required a charging control circuit 108 being provided between the charging input and the pin 107; its output being directly connected to a pin 109 from another conduction train 103, or as required a separation diode 110 being provided between the output and the pin 109; a corresponding pin 111 to the pin 107 being conducted to the charging source 100 and a corresponding pin 112 to the pin 109 being conducted to the load unit 104;
- a charging control circuit 108: related to a mechano-electronic or solid state electronic device to fully or partially control charging current, voltage and charging time;
- a separation diode 110: one or more than one diode element connected in series or serial-parallel between the emergency auxiliary power supply 101 and its output, or one or more than one diode connected in series or series-parallel to regulate the output voltage of the emergency auxiliary power supply 101 by means of its positive drop as required; and
- the load unit 104: including a rechargeable storage 106 comprised a rechargeable secondary battery, super capacitor other storage device, incorporated to a communication, information, home electric appliance, personal electric appliance, instrument, power tool and any other load 113 driven by the load unit 104.

2. An improved serial stage power supply combination for emergency auxiliary power supply as claimed in claim 1, wherein, the charging source the charging source 100 supplies power to the emergency auxiliary power supply 101, in turn, the rechargeable storage 105 in the emergency auxiliary power supply 101 charges the storage 106 in the load unit 104 or supplies power to the load 113 at the same time.

3. An improved serial stage power supply combination for emergency auxiliary power supply as claimed in claim 1, wherein the rechargeable storage 105 in the emergency auxiliary power supply 101 is charging another storage 106 in the load unit 104 or is supplying power to the load 113 at the same time.

4. An improved serial stage power supply combination for emergency auxiliary power supply as claimed in claim 1, wherein, the load 113 is driven by power supplied from the rechargeable storage 106 in the load unit 104.

5. An improved serial stage power supply combination for emergency auxiliary power supply as claimed in claim 1, wherein, the input of the charging source 100 is charging the storage 106 in the load unit 104 and supplying power to the load 113 at the same time.

6. An improved serial stage power supply combination for emergency auxiliary power supply as claimed in claim 1, wherein, voltage and current control and protection devices are provided between the emergency auxiliary power supply 101 and the conduction train 103 essentially comprised of:

- the emergency auxiliary power supply 101: comprised of rechargeable secondary battery, super capacitor or other storage 105, having a capacity greater than that of another storage 106 in the load unit 104 and its charging input being directly connected to a pin 107 from the conduction train 102, or as required a charging control circuit 108 being provided between the charging input and the pin 107; its output being directly connected to a pin 109 from another conduction train 103, or as required a separation diode 110 being provided between the output and the pin 109;
- a conduction train 102: related to a conduction train of specific structure to execute positive-to-positive and negative-to-negative coupling for separated cut-off or incorporated conduction; and configured in plug and socket structure or that similar to an incorporation structure by insertion to transmit power from the charging source 100 to the emergency auxiliary power supply 101;
- another conduction train 103: related to a conduction train of specific structure to execute positive-to-positive and negative-to-negative coupling for separated cut-off or incorporated conduction; and configured in plug and socket structure or that similar to an embedded incorporation structure to transmit power from the emergency auxiliary power supply 101 to the load unit 104;
- an over-current breaker 114: alternatively, a short fuse, or a mechano-electronic or solid-state electronic current breaker connected in series with the source is or is not added to where between the emergency auxiliary power supply 101 and its output interface conduction train 103;
- a limiting protection 115: alternatively, a limiting protection with it resistance changing in proportion with the amperage, comprised of a positive temperature coefficient (PTC) resistor, resistance device, mechano-electronic, or solid-state electronic device connected in series with the source is or is not added to where between the emergency auxiliary power supply 101 and its output interface conduction train 103;
- a current detection circuit 116: an optional circuit provided between the output of the emergency auxiliary power supply 101 and its output interface conduction train 103 connected in parallel with the source; related to an analog or digital current detection device comprised of a mechno-electronic, or solid state electronic device, or an output current detection device indicator, or a detection circuit provided to control analog or digital voltage single references, or a display being further included;

a switch 117: an optional provided between the output of the emergency auxiliary power supply 101 and its output interface conduction train 103 connected in series with the source; related to a switch operated by manual, a solid switch operated by signal, or a switch control circuit;

a voltage detection circuit 118: an optional circuit provided at the output of the emergency auxiliary power supply 101 and connected in parallel with the source; related to an analog or digital voltage detection device comprised of a mechno-electronic, or solid state electronic device, or an output voltage detection device indicator, or a detection circuit provided to control analog or digital voltage signal references, or a display being further included;

a central control 119: also an optional to be provided at the output of the emergency auxiliary power supply 101 to control the limiting protection or the switch and cause the limiting protection to increase resistance for inhibiting the amperage in case of over-current by referring to the outputted amperage; and control the switch to cut off the output once the current reaches the preset value; and a housing 120: made of insulation material, or non-insulation material lined inside with insulation material, accommodating and being integrated with all those devices described above.

7. An improved serial stage power supply combination for emergency auxiliary power supply as claimed in claim 6, both of the conduction trains 102 and 103 are separated from the input and output of the emergency auxiliary power supply 101, and are connected to the emergency auxiliary power supply 101 by a conductor, or a second unit of plug and socket.

* * * * *